Figure 1:
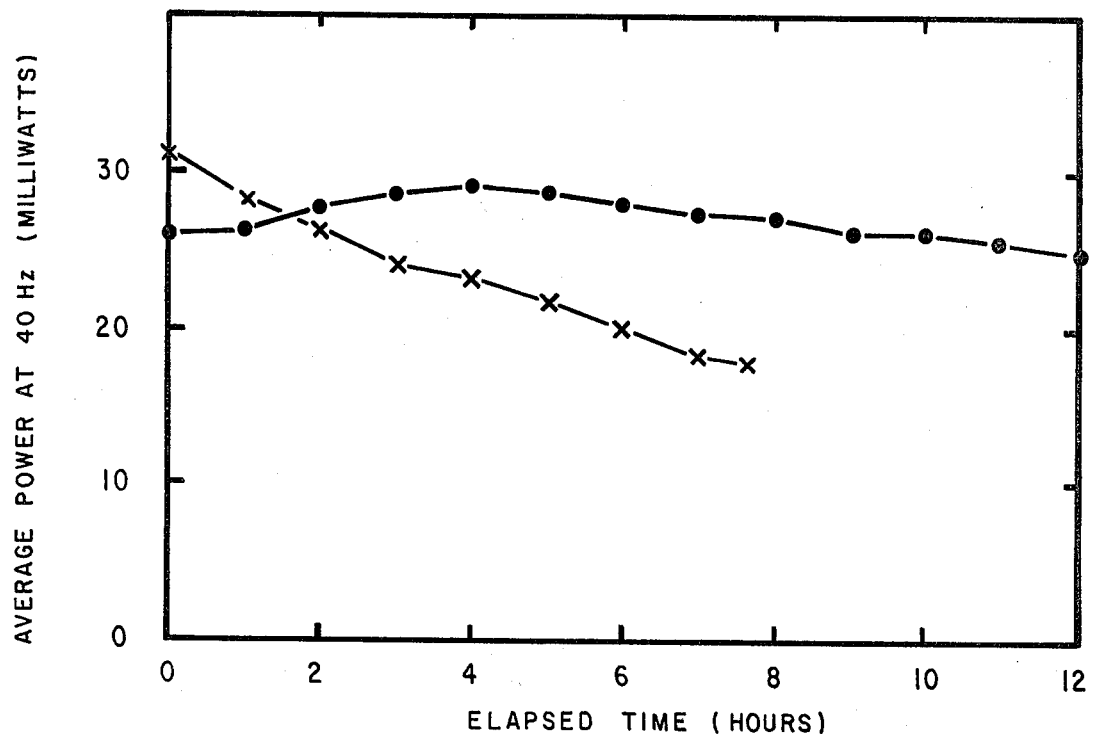

United States Patent [19]

Koch et al.

[11] 4,428,859

[45] Jan. 31, 1984

[54] STABILIZER OF ORGANIC DYE LASERS

[75] Inventors: Tad H. Koch; Robert J. von Trebra, both of Boulder, Colo.

[73] Assignee: University Patents, Inc., Norwalk, Conn.

[21] Appl. No.: 441,324

[22] Filed: Nov. 12, 1982

[51] Int. Cl.³ ............................................. C09K 11/06
[52] U.S. Cl. ................................................ 252/301.17
[58] Field of Search .................................... 252/301.17

[56] References Cited

U.S. PATENT DOCUMENTS 3,541,470  11/1970  Lankard ......................... 252/301.17

OTHER PUBLICATIONS

C. Quannes et al., *J. Am. Chem. Soc.*, 90 (1968), 6527.
Winters, B. et al., *Applied Physics Letters*, vol. 29, No. 12, (1974), p. 723.
Marling, J. et al., *Applied Physics Letters*, vol. 17, No. 12, (1970), 527.

Primary Examiner—John F. Niebling
Attorney, Agent, or Firm—George M. Yahwak

[57] ABSTRACT 1,4-Diazabicyclo[2.2.2]octane (DABCO) has been shown to extend the lifetime of several organic laser dyes in nitrogen laser pumped and flashlamp pumped dye lasers. With 0.010M DABCO, average power output in coumarin dye lasers remains at better than 90% of initial power at least three times longer than without DABCO.

10 Claims, 5 Drawing Figures

STABILIZER OF ORGANIC DYE LASERS

This invention was partially funded by a grant from the U.S. Army Research Office.

The present invention relates to the stabilization of several organic dyes in dye lasers, such as nitrogen laser, Nd-Yag laser, and flashlamp pumped dye lasers by the addition of small amounts of a singlet oxygen quencher such as the compound 1,4-diazabicyclo[2.2.2]octane, commonly referred to as DABCO. With 0.010 M DABCO, for example, average power output remains better than 90% of initial power at least three times longer for coumarin dyes than without DABCO. DABCO is effective in stabilizing dye solutions which are not oxygen degassed and, to a lesser extent, in stabilizing oxygen degassed dye solutions. Average power output, pulse duration, and spectral line width are not significantly affected. Stabilization is proposed to occur through a combination of dye triplet excited state quenching, quenching of singlet oxygen which results from oxygen quenching of dye triplet states, and scavenging of free radicals resulting from dye photoreactions.

Chemists have long recognized the utility of organic dye lasers as tunable narrow-band sources of radiation throughout the visible spectrum. A fundamental problem with these dyes, however, is the inherent deterioration which occurs over the periods these dyes are lased. This deterioration has been thought by many investigators to be the result of irreversible photochemical degradation occurring in the dye solution primarily as a result of the laser pump radiation.

Coumarin dyes are widely used in dye lasers for the blue-green region of light emission. However, their use, as with other organic laser dyes, has long been recognized as being restricted by the photo destruction processes of the dye causing the attenuation of laser power output. Many groups have studied the causes of this photo-destruction in attempts of finding a solution to the problem.

One such group at the University of Maryland (see *Applied Physics Letters*, Vol. 25, No. 12, (1974) 723) reported on the photochemical destruction processes occurring in a flashlamp pumped dye laser using an ethanol solution of 7-diethylamino-4-methylcoumarin. (Eastman Kodak Coumarin 1). Their work found that the fresh dye, a clear blue fluorescent liquid, upon exposure to laser pump radiation, followed two irreversible reaction paths, and the yellow-tinted product of photo-oxidation, 7-diethylamino-4 carboxycoumarin, which they term the laser inhibitor, apparently absorbs light at the dye lasing wavelengths and its formation leads to loss of laser power output. These investigators suggested that dye lifetime could be extended and laser efficiency could be increased by (a) replacement of oxygen in the system with a non-oxidizing triplet state quencher; (b) replacement of the methyl group within the dye with a less reactive group; and (c) removal of the photochemically produced laser inhibitor by continuously filtering the dye solution through an alumina filter to remove polar photoproducts.

Our research indicated that singlet oxygen resulting from energy transfer from triplet dye molecules could be a possible intermediate in the photo-oxidation of Coumarin 1. Marling and his co-workers reported (*Applied Physics Letters*, (1970) 527) that the accumulation of triplet dye molecules (which quenches lasing in a few microseconds by absorption between triplet levels during excitation) can be reduced by adding a triplet-state quenching additive (TSQA) to the lasing solution. This almost eliminates this form of laser output power attenuation. Oxygen has been shown to be an efficient TSQA for members of the coumarin and xanthene dye families.

If singlet oxygen was indeed an intermediate of photo-oxidation, as our research suggested, then another possible approach not contemplated by Winters and his group at the University of Maryland to the stabilization of coumarin laser dyes would be the addition of a substance which would deactivate the singlet oxygen. DABCO had been reported to be an efficient electron transfer quencher of singlet oxygen in non dye systems (that is, in a system using 1,3-diphenylisobenzofuran) long before the University of Maryland research was reported (see C. Ouannes and T. Wilson, *J. AM. CHEM. SOC.* 90 (1968) 6527). The use of singlet oxygen deactivators such as DABCO have also been disclosed in German Offen. 2,625,386 to prevent the catalytic light fading of yellow-blue textile dye mixtures.

Our research also has shown that Coumarin 1 and 7-dimethylamino-4-methylcoumarin (Eastman Kodak Coumarin 311) photodegrade in the absence of oxygen as a triplet quencher via formation of reactive radicals. This process is a bimolecular reaction between excited triplet coumarin and ground state coumarin. The reaction also leads to products which absorb light at the dye lasing wavelengths causing loss of laser power output. Consequently, addition of an electron transfer free radical scavenger would deactivate this mode of photodegradation. DABCO is a good electron transfer free radical scavenger because it has a low oxidation potential and forms a relatively stable radical cation (see T. M. McKinney and D. H. Geske, *J. AM. CHEM. SOC.* 87 (1965) 3013).

It is, accordingly, a primary object of the present invention to provide a means for the stabilization of dye lasers.

It is another objective of the present invention in accordance with the preceding object, to provide a means for the stabilization of dye lasers by providing the dye with a component and/or components which are singlet oxygen quenchers and free radical scavengers.

These and other objectives of the present invention are achieved, and will become apparent from the following description, examples and claims of our invention.

To test the effectiveness of DABCO in stabilizing organic laser dyes, conventional and commercially available Coumarin laser dyes were employed as the test systems in a nitrogen laser pumped dye laser, flashlamp pumped dye laser, and Nd-Yag laser pumped dye laser. Among the specific organic laser dyes employed were Coumarin 1, that is, 7-diethylamino-4-methyl Coumarin; Coumarin 311, that is, 7-dimethylamino-4-methyl Coumarin; Coumarin 120, that is, 7-amino-4-methyl Coumarin; Coumarin 314, that is 1,2,4,5,3H,6H,10H-tetrahydro-9-carbethoxy(1)benzopyrano(9,9a,1g-h)quinolizin-10-one, in a flashlamp pumped dye laser; Coumarin 1 and LD-390, that is 7-dimethylamino-1-methyl-4-methoxy-8-azaquinolin-2-one in a Nd-Yag laser pumped dye laser.

The nitrogen laser, a Lambda Physik EMG 101 excimer laser, operating at 40 Hz, produced about 5 millijoules per pulse, or 0.20 watt, at 337 nm. The nitrogen laser output was focused with a cylindrical lens onto a Lambda Physik Model FL 42/2 dye cell with a back mirror 100 percent reflecting, and a front output coupler 50 percent reflecting in the region of 460 nm. The average power output of the dye laser and nitrogen laser was monitored as a function of time employing a Scientech 36-0001 calorimeter power meter connected to a strip chart recorder. The average power of the nitrogen laser did not change significantly during the course of the experiments.

In a typical experiment the nitrogen laser was given a fresh charge of gas and operated until the power output stabilized at about 0.20 watt. The appropriate amount of dye was dissolved in 150 mL of absolute ethanol to give a solution with a concentration of $5.0 \times 10^{-3}$ M. The dye solution was pumped through the dye cell at 1200 mL/min. The experiments were typically run until the power output of the unstabilized dye solution decreased to 50% of its initial value. After the control experiment was performed the dye system was thoroughly rinsed with absolute ethanol before adding a new dye solution containing 0.010 M DABCO. The DABCO was purified by sublimation at 65° C. (10 Torr) prior to use. A number of specific examples are detailed below:

EXAMPLE 1

The test solutions were prepared by dissolving 0.231 grams of Coumarin 1 in 200 ml of dry ethanol which had been distilled from Magnesium ethoxide and stored over 3 Å molecular sieves. The DABCO test solution was made to contain 2.24 grams, or 0.0200 moles, of DABCO which had been sublimed at 10 mm/65° C. prior to use.

Before starting, the dye laser was thoroughly rinsed with dry ethanol and then with a $5.0 \times 10^{-3}$ M Coumarin 1 solution. The dye laser was tuned for maximum power output. After draining the rinse solution, a clean filter tube was put in the filter housing, and the dye solution under test was added. The nitrogen laser was given a fresh fill of gas for each experiment and run until the power output stabilized before starting the experiment, and was operated at 40 Hz with a power output of about 5 millijoules per pulse (0.2 watts average power).

The results of this experiment are tabulated in Table 1, and depicted graphically in FIG. 1.

In FIG. 1, the symbol "o" indicates $5.0 \times 10^{-3}$ M Coumarin 1 plus 0.10 M DABCO in absolute ethanol; the symbol "x" indicates $5.0 \times 10^{-3}$ M Coumarin 1 in absolute ethanol.

TABLE 1

EFFECT OF 0.10 M DABCO ON THE POWER OUTPUT OF A COUMARIN 1 NITROGEN LASER PUMPED DYE LASER

| Elapsed Time (Hours) | Dye Laser Average Power Output (mW) | |
|---|---|---|
| | −DABCO | +DABCO |
| 0 | 30.8 | 25.8 |
| 1.0 | 28.2 | 26.2 |
| 2.0 | 25.9 | 27.3 |
| 3.0 | 24.0 | 27.8 |
| 4.0 | 23.6 | 28.1 |
| 5.0 | 21.7 | 27.7 |
| 6.0 | 19.9 | 27.4 |
| 7.0 | 18.4 | 26.9 |
| 7.5 | 17.8 | — |
| 8.0 | — | 26.6 |
| 9.0 | — | 25.9 |
| 10.0 | — | 25.8 |
| 11.0 | — | 25.6 |
| 12.0 | — | 24.7 |

EXAMPLE II

Using the Experiment I protocol with the following changes, the effect of DABCO on Coumarin 120 was also examined:

Prior to beginning, dye cell windows were cleaned with conc. chromic acid and rinsed well. The test dye solutions were prepared by dissolving 0.175 grams of Coumarin 120 in 200 ml of dry ethanol to give $5.0 \times 10^{-3}$ M Coumarin 120 solutions. 0.224 g of DABCO was added to the dye solution to give a final DABCO concentration of 0.010 M.

Figure 2:
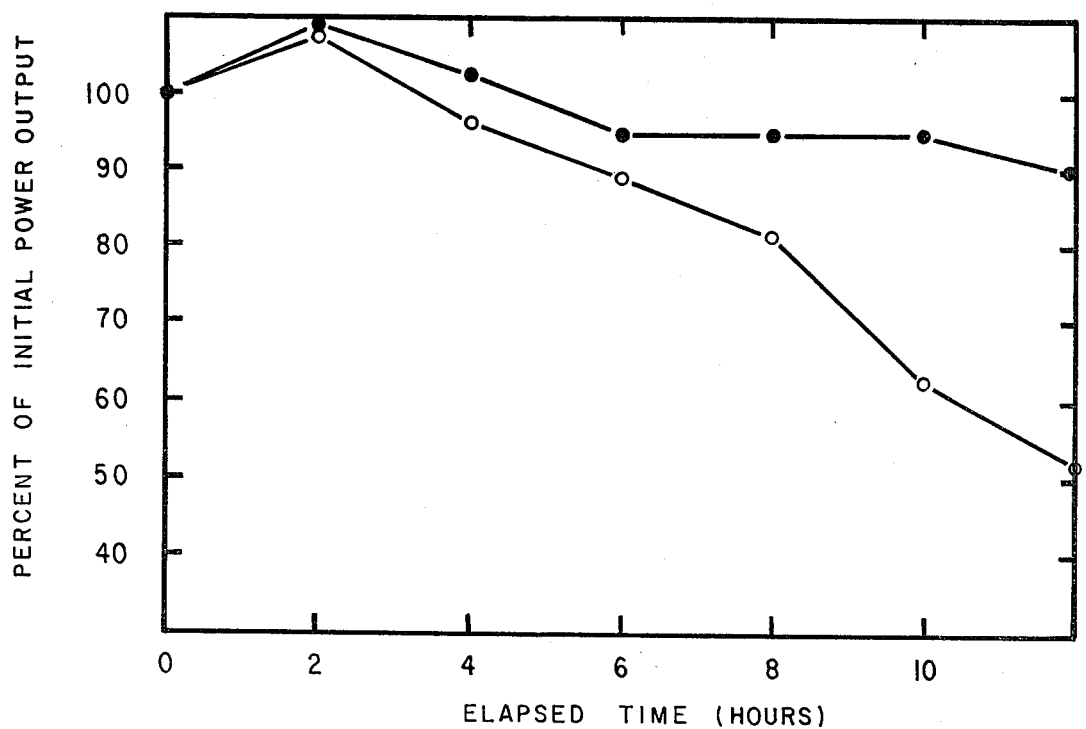

The results of this experiment are tabulated in Table II, and depicted graphically in FIG. 2.

In FIG. 2, the symbol "o" indicates $5.0 \times 10^{-3}$ M Coumarin 120 in absolute ethanol; the symbol "●" indicates $5.0 \times 10^{-3}$ M Coumarin 120 plus 0.010 M DABCO in absolute ethanol.

After twelve hours of operation at 40 Hz, the power output from the unstabilized dye solution decreased to 48.5% of the initial value. The addition of 0.010 M DABCO to the dye solution resulted in a loss of only about 10% of the initial power output in a twelve hour period.

TABLE II

EFFECT OF 0.010 M DABCO ON THE POWER OUTPUT OF A COUMARIN 120 NITROGEN LASER PUMPED DYE LASER

| Elapsed Time (Hours) | Dye Laser Average Power Output (mW) | |
|---|---|---|
| | −DABCO | +DABCO |
| 0 | 27.0 | 22.3 |
| 1.0 | 29.2 | 24.2 |
| 2.0 | 29.0 | 24.3 |
| 3.0 | 28.0 | 23.9 |
| 4.0 | 26.0 | 23.0 |
| 5.0 | 25.0 | 22.0 |
| 6.0 | 24.0 | 21.0 |
| 7.0 | 22.0 | 21.0 |
| 8.0 | 22.0 | 21.0 |
| 9.0 | 18.0 | 21.0 |
| 10.0 | 17.0 | 21.0 |
| 11.0 | 15.0 | 20.5 |
| 12.0 | 13.9 | 19.8 |

EXAMPLE III

Test dye solutions were prepared by dissolving 0.100 grams of Coumarin 314 in 1 liter of reagent grade methanol and 1 liter of distilled water to give a solution of $1.6 \times 10^{-4}$ M Coumarin 314. New dye solutions were prepared for each experimental run; for the DABCO run, 2.24 grams of sublimed DABCO was added to the dye solution to give a DABCO concentration of 0.010 M.

New dye lines and a new filter were installed in a Chromatix CMX-4 flashlamp laser with a Pyrex flow tube which filtered the flashlamp output. The flash lamp was operated at 10 pulses per second and an energy of 15 Joules per pulse. The dye laser was tuned to about 508 nm where the maximum power output was obtained. Dye laser power output was measured with a Scientech 36-0001 power meter.

Figure 3:
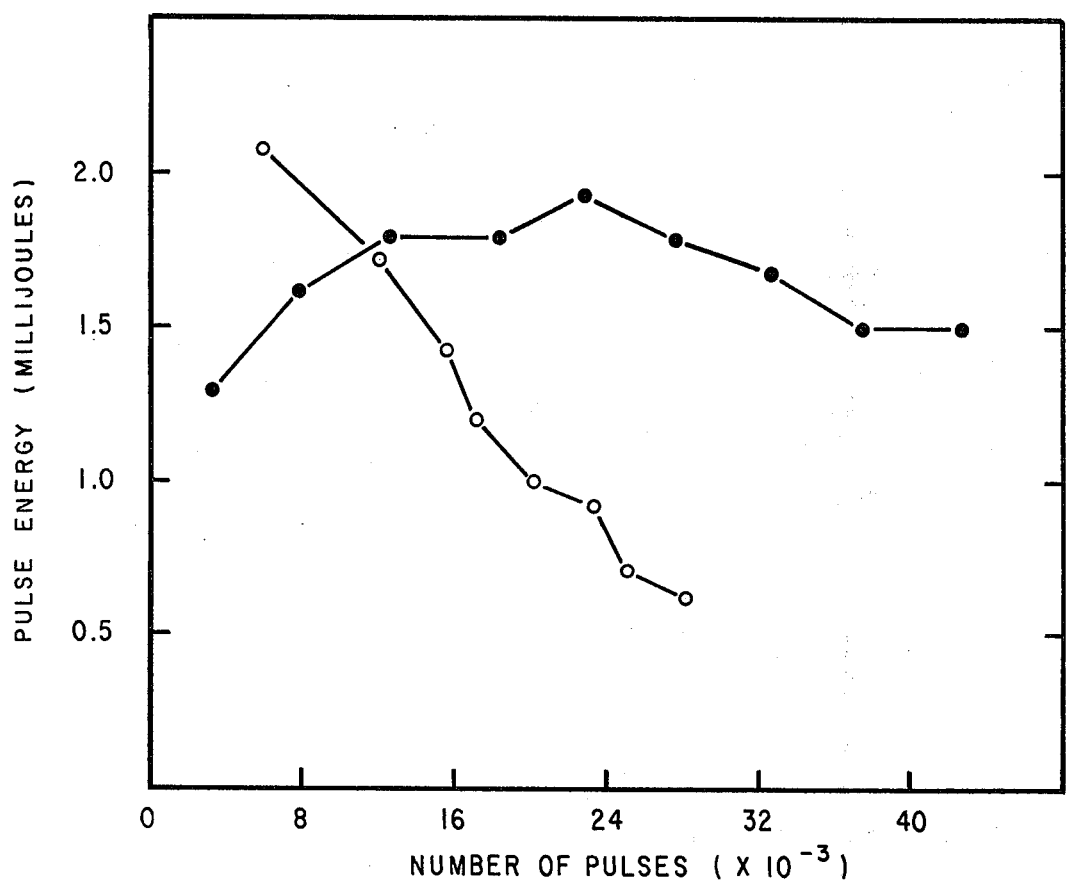

The results of this experiment are tabulated in Table III, and graphically depicted in FIG. 3.

In FIG. 3, the curve is depicted as being the pulses energy in millijoules per pulse; this is equivalent to ten per cent of the average dye laser power output in milliwatts contained in Table III.

The symbol "o" indicates $1.6 \times 10^{-4}$ M Coumarin 314 in 50% methanol 50% water; the symbol "●" indicates $1.6 \times 10^{-4}$ M Coumarin 314 plus 0.010 M DABCO in 50% methanol 50% water.

TABLE III

EFFECT OF 0.010 M DABCO ON THE POWER OUTPUT OF A FLASHLAMP PUMPED COUMARIN 314 DYE LASER

| No. of Shots | Average dye laser power output (mW) | |
|---|---|---|
| | −DABCO | +DABCO |
| 1 | Tuning Laser | |
| 2893 | — | 13 |
| 7438 | 21 | — |
| 7893 | — | 16 |
| 11938 | 17 | — |
| 12893 | — | 18 |
| 15438 | 14 | — |
| 17893 | — | 18 |
| 17938 | 12 | — |
| 20438 | 10 | — |
| 22893 | — | 19 |
| 22938 | 9 | — |
| 25438 | 7 | — |
| 27438 | 6 | — |
| 27893 | — | 18 |
| 32893 | — | 17 |
| 37893 | — | 15 |
| 42893 | — | 15 |

In addition, DABCO did not change the spectral line width or pulse duration of the laser output.

Figure 4:
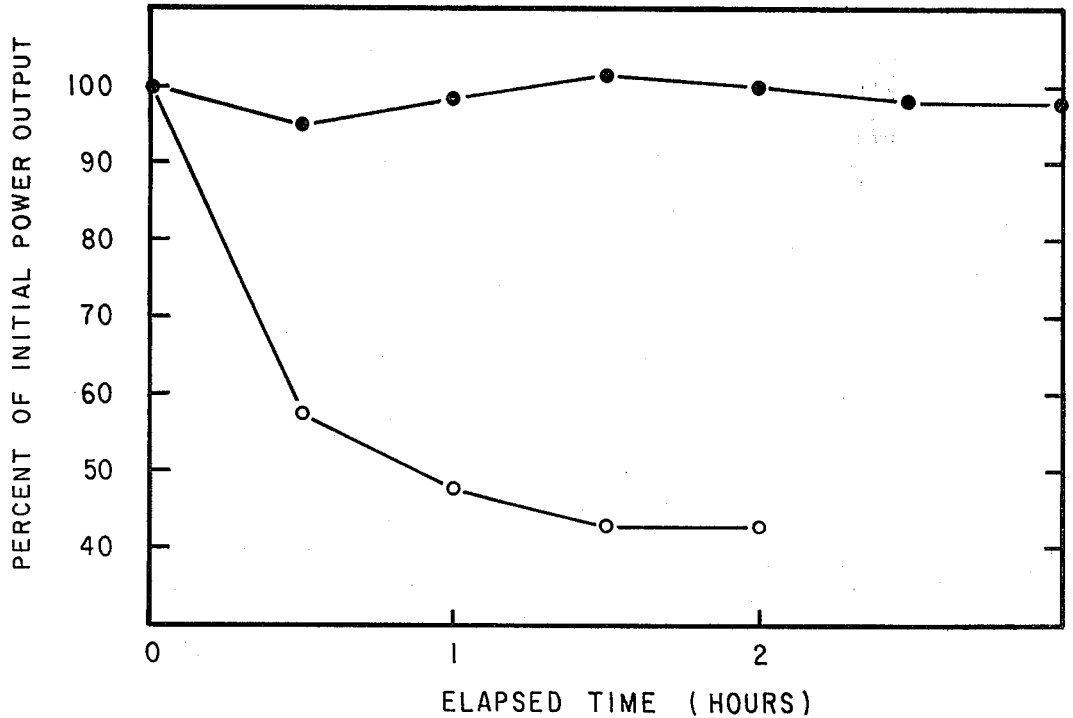

FIG. 4 depicts the effect of 0.010 M DABCO on the power output of a 0.20 watt nitrogen laser pumped Coumarin 311 dye laser. The symbol "o" indicates $5.0 \times 10^{-3}$ M Coumarin 311 in absolute ethanol; the symbol "●" indicates $5.0 \times 10^{-3}$ M Coumarin 311 plus 0.010 M DABCO in absolute ethanol. A loss of more than 50% of the power was observed in one hour for the unstabilized dye with the laser operating at 40 Hz, and the addition of 0.010 M DABCO resulted in less than a 5% power loss in a three hour period.

Similar results to those with the nitrogen laser pumped dye laser are found using a Quanta Ray Nd-Yag pumped dye lasers. For example, in one test a dye solution was prepared by dissolving 225 mg of LD-390 and 590 mg of DABCO in one liter of methanol to give a solution of $9.6 \times 10^{31}$ $^4$ M LD-390 and $5.3 \times 10^{-3}$ M DABCO. The oscillator dye cell of the laser was charged with 800 ml of this solution; the amplifier cell was charged with 200 ml of this solution and 800 ml of methanol to give a solution of $1.9 \times 10^{-4}$ M LD-390 and $1.0 \times 10^{-3}$ M DABCO. In another test, employing a Nd-Yag laser, the amplifier cell was charged with $2.6 \times 10^{-4}$ M Coumarin 1 and $1.3 \times 10^{-3}$ M DABCO in methanol solvent; the oscillator cell was charged with $1.3 \times 10^{-3}$ M. Coumarin 1 and $6.7 \times 10^{-3}$ M DABCO in methanol solvent. In both test systems, the results obtained with the addition of DABCO indicate that the power output of the Nd-Yag laser dropped more slowly than when the system lacked DABCO. The useful lifetime of the dye solution was approximately five times greater with DABCO present.

In order to confirm that DABCO is stabilizing the organic laser dyes by singlet oxygen quenching and quenching a reactive excited state and/or reactive radicals of the dye, further experimentation was carried out.

Figure 5:
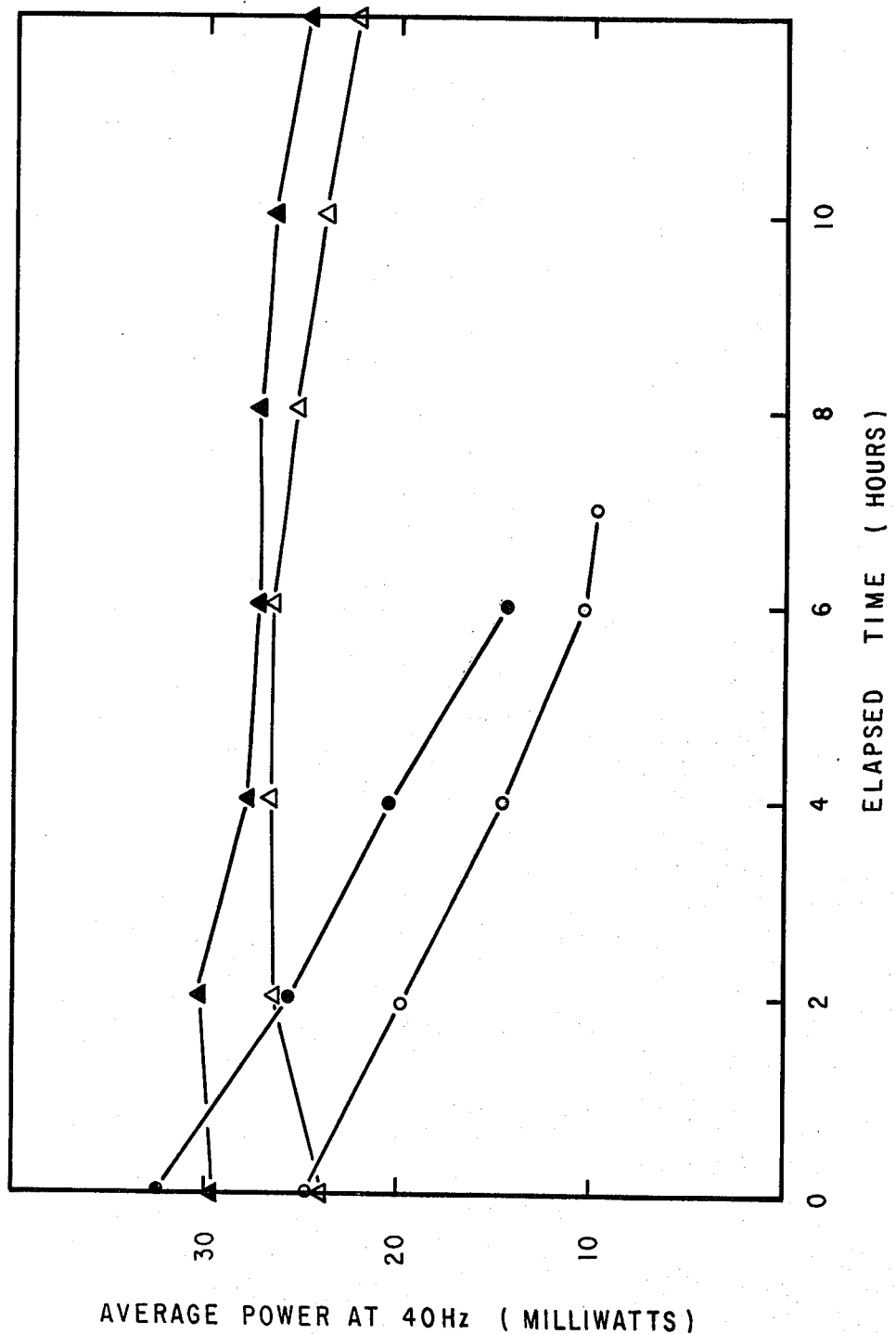

To determine the mode of action of DABCO and the role of oxygen, a series of laser experiments was performed with Coumarin 1. In two of the experiments the dye solutions were oxygen degassed for 30 minutes with argon prior to irradiation with the nitrogen laser. During these irradiations a positive pressure of argon on the dye solution reservoir was also maintained. One of the oxygen degassed solutions contained 0.010 M. DABCO and the other did not. Laser output stability with oxygen degassed solutions was then compared with the stability using air saturated solutions. As shown in FIG. 5, DABCO was effective in stabilizing the power output from a Coumarin 1 dye laser even when the dye solution was oxygen degassed, although not as effective as when oxygen was present.

In FIG. 5, the symbol "o" indicates $5.0 \times 10^{-3}$ M Coumarin 1 in absolute ethanol oxygen degassed with argon; the symbol "●" indicates $5.0 \times 10^{-3}$ M Coumarin 1 in absolute ethanol; the symbol "Δ" indicates $5.0 \times 10^{-3}$ M Coumarin 1 plus 0.010 M DABCO in absolute ethanol oxygen degassed with argon; and the symbol "▲" indicates $5.0 \times 10^{-3}$ M Coumarin 1 plus 0.010 M DABCO in absolute ethanol.

On the basis of these observations, we believe that DABCO acts in the ways described above to stabilize coumarin dyes. When oxygen is present, DABCO quenches the singlet oxygen presumably produced from oxygen quenching of coumarin triplet states. In addition DABCO quenches a reactive excited state of the coumarin, most likely the triplet state, and/or radicals of the coumarin resulting from reaction of the triplet state. The triplet state is implicated because the addition of 0.010 M DABCO to $3.5 \times 10^{-6}$ M Coumarin 1 in absolute ethanol results in less than 1% quenching of coumarin fluorescence and 0.010 M DABCO does not attenuate dye laser output power.

Evidence for reactive radical formation in the absence of oxygen is the observation of deuterium incorporation predominantly at the dimethylamino substituent in recovered Coumarin 311 from irradiation of anaerobic solutions in ethanol-OD solvent. The quantum yield of deuterium incorporation is $6.3 \times 10^{-5}$ at $1.0 \times 10^{-2}$ M Coumarin 311 and is directly proportional to the coumarin concentration. Furthermore, the quantum yield of deuterium incorporation is increased by the addition of sulfur free radical chain transfer agents such as ethanethiol and ethyl disulfide or DABCO. The dependence of quantum yield on coumarin concentration establishes the bimolecular nature of the reaction. The selective triplet quencher tetramethyldiazetine dioxide at $10^{-3}$ M quenches half of the deuterium incorporation, establishing reaction via a triplet state. Deuterium incorporation is proposed to occur via disproportionation of reactive radicals 1 and 2 after hydrogen deuterium exchange with solvent as shown in Scheme 1. Combination of Radicals 1 and 2 is proposed to lead to products which absorb at the lasing wavelength of the dye. For an analogy to this mode of photochemical reactivity in a structurally related non laser dye organic molecule, 4,4'-bis(N,N-dimethylamino)benzophenone, see: T. H. Koch and A. H. Jones, J. AM. CHEM. SOC. 92 (1970) 7503.

Scheme 1

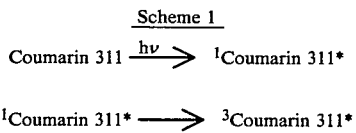

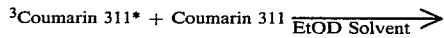

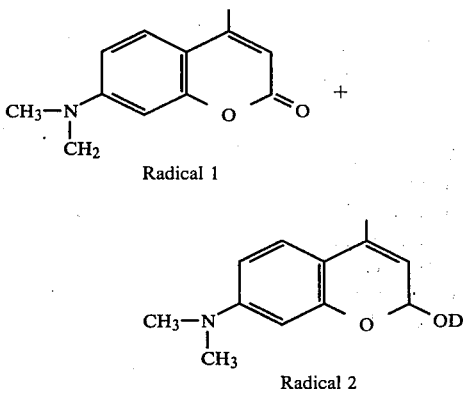

Radical 1

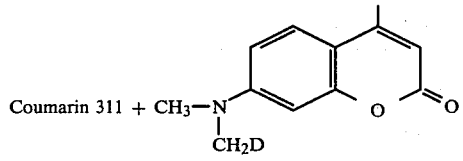

Although DABCO is the preferred stabilizer, other nitrogen containing molecules which have a low oxidation potential, form a relatively stable radical cation, and are transparent to the pumping and lasing radiation are included. Among such compounds are, for example 1,5-diazabicyclo[3.3.1]nonane; 9,9-cyclopentamethylene-1,5-diazabicyclo[3.3.1]nonane; 2,2-cyclopentamethylene-1,3-diazatricyclo[3.3.1.1$^{3,7}$]decane; 1,5-diazabicyclo[3.2.2]nonane; 1,3,6,8-tetraazatricyclo[4.4.1.1$^{3,8}$]dodecane; 1,2-bis(N,N-dimethylamino)ethane; and 1,4-dimethyl-1,4-pipeazine. Mesocyclic thioethers which could serve as electron transfer quenchers of singlet oxygen and the triplet excited states or radicals resulting from triplet excited states are those compounds having low oxidation potentials for oxidation by one or two electrons and which can reversibly form stable radical cations or dications. These include, for example, 1-5-dithiacyclooctane; 1,6-dithiacyclodecane; 7,8-benzo-1,5-dithiacyclononane; and 1,5-dithiacyclononane.

Although the experiments described here were performed with coumarin laser dyes, in principle any laser dye which degrades via dye triplet state, singlet oxygen and/or reactive radicals of the dye should be stabilized in a dye laser by a substance such as DABCO.

In addition to the coumarin laser dye used as the primary test system to demonstrate the stabilizing features of the present invention, the present invention is applicable to other types of organic laser dyes such as the LD-390 laser dye, an azaquinoline-type dye mentioned previously. In addition, the effect of DABCO on the longevity of a broader spectrum of laser dyes pumped with a XeCl excimer laser has also been studied with the results appearing in the following table:

| Dye | Types | Result |
|---|---|---|
| Rhodamine 610 | Xanthene | Pumping at 15 Hz. 1.2 watts average power. Without DABCO: 41% power loss in 8.5 hours. With 0.02 M DABCO: 21% power loss in 9.0 hours. |
| BBQ | p-Quaterphenyl | Pumping at 10 Hz. 0.4 watts average power. Without DABCO: 50% power loss in 4.0 hours. With 0.01 M DABCO: 29% power loss in 4.0 hours. |
| Stilbene 420 | Stilbene. | Pumping at 10 Hz. 0.4 watts average power. Without DABCO: 55% power loss in 8.0 hours. With 0.01 M DABCO: 34% power loss in 8.0 hours. |

In summary, small amounts of a singlet oxygen quencher and radical scavenger such as DABCO, have been shown to be effective in extending the useful lifetime of a variety of organic dyes, such as the coumarin dyes, employed in dye lasers. A substance such as DABCO is especially effective because it is capable of deactivating all of the proposed reactive intermediates leading to dye degradation and laser power output attenuation: dye triplet state, singlet oxygen and reactive radicals of the laser dye resulting from the triplet state. This deactivation is accomplished without a significant effect on the excited singlet state of the dye which results in lasing and without generating product molecules which would interfere with the lasing.

From the foregoing description, one skilled in the art can easily ascertain the essential characteristics of our invention and without departing from the spirit and scope thereof, can make various changes and/or modifications to the invention for adapting it to various usages and conditions. Accordingly, such changes and modifications are properly intended to be within the full range of equivalents of the following claims.

Having thus described our invention and the manner and process of making and using it in such full, clear, concise, and exact terms as to enable any person skilled in the art to which it pertains, or with which it is most closely connected, to make and use the same, and having set forth the best modes for carrying out our invention;

We claim:

1. A composition of matter for use in a dye laser comprising an organic laser dye which degrade via free radical reaction and/or by reaction with singlet oxygen, and a singlet oxygen quencher.

2. The composition of claim 1 wherein the laser dye is a coumarin dye.

3. The composition of claim 1 wherein the singlet oxygen quencher is 1,4-diazabicyclo[2.2.2]-octane.

4. The composition of claim 1 wherein the singlet oxygen quencher is also a quencher of the reactive excited state of the laser dye.

5. The composition of claim 1 wherein the singlet oxygen quencher is also a scavenger of reactive radicals of the laser dye.

6. In a method for preparing an organic laser dye which degrades via free radical reaction and/or by reaction with singlet oxygen, the improvement which comprises adding an amount of a singlet oxygen quencher sufficient to stabilize said organic laser dye.

7. A composition of matter comprising DABCO and an organic laser dye which degrades via free radical reaction and/or by reaction with singlet oxygen.

8. The composition of claim 7 wherein the organic laser dye is selected from the group consisting of Coumarin 1, Coumarin 120, Coumarin 311, Coumarin 314, and LD-390.

9. The composition of claim 7 wherein the organic laser dye is selected from the group consisting of xanthene, p-quaterphenyl, and stilbene type laser dyes.

10. A composition of matter for use in a dye laser comprising an organic laser dye which degrades via free radical reaction and/or by reaction with singlet oxygen, and an electron transfer quencher.

* * * * *

UNITED STATES PATENT AND TRADEMARK OFFICE
CERTIFICATE OF CORRECTION

PATENT NO. : 4,428,859
DATED : January 31, 1984
INVENTOR(S) : Koch & Trebra

It is certified that error appears in the above—identified patent and that said Letters Patent is hereby corrected as shown below:

IN Column 5, line 53 delete "$9.6 \times 10^{314}$" and insert --$9.6 \times 10^{-4}$--

Signed and Sealed this

Seventeenth Day of April 1984

[SEAL]

Attest:

GERALD J. MOSSINGHOFF

Attesting Officer    Commissioner of Patents and Trademarks